United States Patent Office 3,535,110
Patented Oct. 20, 1970

3,535,110
METHOD OF PRODUCING REFRACTORY BODIES HAVING CONTROLLED POROSITY
Hoyt H. Todd, La Habra, Calif., assignor, by mesne assignments, to the United States of America as represented by the Administrator of the National Aeronautics and Space Administration
No Drawing. Filed June 9, 1967, Ser. No. 644,799
Int. Cl. C22c 29/00
U.S. Cl. 75—202                     22 Claims

ABSTRACT OF THE DISCLOSURE

A method for producing a porous body of selected pore size and concentration and large surface area and the body produced thereby where initially a porous body is formed by pressing a mixture of fine refractory metal powder such as tungsten and fine inert metal powder such as copper or fine boron composition powder such as boron nitride or both and then sintering the resulting compacted body.

BACKGROUND OF THE INVENTION

Origin of the invention

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Field of the invention

The field of the present invention is powder metallurgy methods and the bodies produced by such methods. The uses of such bodies are high temperature structures such as electrodes, lamp filaments, rocket nozzles, turbine blades, and bearings.

Description of the prior art

It has been recognized for many years that chemical rocket engines are not suitable for long range space missions because of the enormous amounts of fuel they require. Consequently, efforts have been directed toward the development of electric rocket engines which are capable of generating thrust over long periods of time with a small expenditure of fuel. The presently known most efficient electric rocket engine is the ion engine wherein fuels such as cesium are converted from neutral atoms to ions and then such ions are accelerated through an electric field to provide the thrust. One well-known way of forming an ion from a neutral atom, i.e., stripping an electron from the atom, involves the surface ionization process wherein the atom is brought in to contact with a suitable heated ionizer surface such as tungsten and such contact causes the electron to leave the atom. The presently preferred method of contacting the atom with the ionizer surface involves diffusing a cesium vapor through a heated, finely porous plug of tungsten with the result that the cesium ions are discharged from the tungsten surface into an adjoining electric field. A brief description of the operation of such ion engine is to be found in International Science and Technology, January 1964, pp. 52–59.

From the foregoing brief discussion, it can be seen that for the proper operation of an ion engine, it is necessary to have a heated finely porous plug of material such as tungsten through which a vapor such as cesium vapor may diffuse and evaporate from the frontal surface as ions. After considerable experience, it has been found that a very small average pore size and a very high average pore concentration are necessary to obtain the desired degree of ionization when the vapor passes through the porous plug. Thus, for example, it has been found that for ionizing cesium vapor by passing it through a tungsten plug, an average pore size of about 1 to 5 microns width with a ratio of pore surface area to solid surface area in the range of about 0.50 to 0.75. Such selected pore size and concentration as well as large surface area may be achieved by the straight forward powder metallurgy technique of pressing and sintering a fine tungsten powder in the size range of about 1 to 5 microns; however, when such technique uses the conventional hydrogen-reduced or angular fine tungsten powder, the resulting porous body is unstable at high temperatures. Such instability is due to the high free surface energy present because of the large surface area of such fine powders and results in the densification of the porous body so that over a period of time both the porosity and permeability are substantially decreased. A substantial improvement in the stability problem was first achieved by the use of spherical tungsten powder rather than angular tungsten powder since it has substantially less surface area for the same size range of particles. However, despite such improvement, the attainment of stable porous bodies with such selected pore size and concentration continued to present substantial problems. One problem was that even using spherical tungsten powder, the porous body was unstable for long periods of operation at high temperature. A second problem, particularly with respect to the commercial utilization of such porous bodies was that such fine spherical tungsten powder is very expensive as compared to the usual angular tungsten powder. For example, spherical tungsten powder of less than about 1 micron diameter costs on the order of $1,000 per pound while comparable angular tungsten powder costs about $4 per pound. Consequently, extensive research was conducted along the line of the addition of an inhibiting material which would retard the densification of the porous body without altering its other surface characteristics. Thus, the addition of minor amounts of metals such as irridium, rhenium, chromium, aluminum, and tantalum, and combinations thereof, were tested with limited success. For example, the addition of small amounts of finely powdered tantalum and rhenium to the fine spherical tungsten powder substantially reduced the rate of densification at high temperatures but at the expense of a greatly altered microstructure of the porous body.

SUMMARY OF THE INVENTION

Consequently, an object of the present invention is an inexpensive, stable, porous body having a selected pore size and concentration and large surface area.

A more specific object of the present invention is a porous body having high porosity and permeability with substantially all of its pores being elongated but their length to width ratio is greater than about 5 and/or substantially all of its surface area coated by a boron composition.

Still another object of the present invention is a method for producing an inexpensive, stable, porous body having a selected pore size concentration and large surface area.

Thus, in general, the present invention involves the method for producing a porous body having a selected pore size and concentration and a large surface area and the porous body produced by such method which includes forming a porous body comprising a mixture of fine refractory metal powder and either fine boron composition powder or fine inert metal powder, or both. Said inert metal is substantially insoluble in the refractory metal and has a melting temperature above the sintering temperature of said refractory metal. The formed body is then heated to a temperature above such sintering temperature and below such melting temperature for a time period adapted to establish a sintering pattern in the body. Finally, the body is heated to a temperature above the melting temperature for a time period adapted to substantially completely evaporate the inert metal powder and sinter the refractory metal powder to a selected pore size.

DESCRIPTION OF THE PREFERRED EMBODIMENTS

One method of the present invention involves first forming a porous body comprising a mixture of fine refractory metal powder and fine inert metal powder. Such forming may be done by the usual powder metallurgy technique of pressing the porous body to the desired configuration at a pressure in the range of 40,000 p.s.i. to 80,000 p.s.i. The refractory metal used may be selected from the class consisting of Groups IV–B, V–B, VI–B, VII–B, and VII metals. The Group IV–B metals include titanium, zirconium, and hafnium. The Group V–B metals include vanadium, columbium, and tantalum. The Group VI–B metals include chromium, molybdenum, and tungsten. The Group VII–B metals include manganese, technetium, and rhenium. The Group VIII metals include iron, cobalt, nickel, ruthenium, rhodium, palladium, oxmium, iridium, and platinum. The preferred refractory metals are tungsten and molybdenum. The particle size of the fine refractory metal powder depends upon the selected pore size and concentration. In the case of the tungsten ionizer, for the ion engine described above, angular tungsten powder of about 1 micron or less diameter is used. Spherical tungsten powder of the same size, may, of course, also be used; however, its high cost practically prohibits its use because of the improved results obtained by the present invention. The inert metal used in said mixture must be substantially insoluble in the refractory metal and have a melting temperature above the sintering temperature of the refractory metal. In practice, substantial insolubility in the present process occurs when the inert metal is less than about 1% soluble in the refractory metal. The inert metal may be selected from the class consisting of Groups I–B, II–B, III–A, and IV–A metals. Group I–B metals include copper, silver, and gold. Group II–B metals include zinc, cadmium, and mercury, but mercury is effectively excluded because of its low melting point. Group III–A metals include aluminum, gallium, indium, and thallium. Group IV–A metals include germanium, tin, and lead. For compacts pressed from tungsten, molybdenum, or tantalum powder, the preferred inert metal is copper. The weight concentration of the inert metal powder in the mixture is in the range from about 5% to about 15%. The particle size of the fine inert metal also, of course, depends upon the selected pore size and concentration. In the case of the tungsten ionizer for the ion engines described above, the fine copper powder having a particle size of −400 mesh is used.

The next step of the method involves heating the formed porous body to a temperature above the sintering temperature of the pressed compact and below the melting temperature of the inert additive for a time period adapted to establish a sintering pattern in the formed body. Such temperature and time period depend upon the particular refractory metal and inert metal chosen. However, in the case of the ion engine porous plug described above using a mixture of tungsten and copper, the temperature range is from about 1,000° C. to 1,100° C. and the time period is about two hours. Such heating should take place in an inert or reducing atmosphere. Thus, in the case of the ion engine tungsten ionizer, the heating takes place in a hydrogen atmosphere.

Finally, the formed and presintered body is heated above the melting temperature of the inert metal for a time period adapted to substantially completely evaporate the inert metal powder and sinter the refractory metal powder to a selected pore size. Thus, such final steps substantially completely evaporate the inert metal powder and sinter the refractory metal powder to the selected pore size. Again, the temperature and time period depend on the refractory metal and inert metal selected. In the case of the tungsten ionizer, using a mixture of tungsten and copper, a temperature of about 1500° C. is used to evaporate the copper while a temperature of about 1800° C. is used to sinter the tungsten. The time period for the copper evaporation is about one-half hour while the time period for the tungsten sintering is about one-half to one hour. The evaporation of the copper should be conducted in a vacuum such as under a pressure of about $10^{-4}$ torr until the copper is completely removed. The sintering of the tungsten should be conducted in an inert or reducing atmosphere or in a vacuum and in the case of the tungsten ionizers, a vacuum is used. It should be noted that the final heating step is conveniently considered to be a single heating step although the initial portion of it is preferably conducted at a temperature lower than the final portion of it; however, the heating may be conducted as a single continuous step. Similarly, the presintering heating step and the evaporation and sintering heating step may be considered a single heating step and be conducted as one continuous heating step with the temperature being initially relatively low and successively increased during the subsequent portions of the heating step. However, it has been found convenient to conduct the pre-sintering heating step in an inert or reducing atmosphere furnace and then conducting the evaporation and sintering heating step in a vacuum furnace with an intermediate cooling step to permit transfer therebetween.

The porous body produced by the foregoing method is a sintered refractory metal powder having a high porosity and permeability. Because of the shape and distribution of the inert metal powder, substantially all of the pores are elongated so that the length to width ratio is greater than about 5. The ratio of the surface pore area to surface solid area is about 0.60 with an initial weight concentration of copper in the tungsten and copper mixture of about 8%. Also, the pore network in the porous body has substantially improved continuity and geometry which facilitates the vapor flow therethrough and electron transfer.

Another method of the present invention for producing a stable porous body having a selected pore size and concentration and large surface area includes forming a porous body comprising a mixture of fine refractory metal powder and fine boron composition powder. The refractory metal may be selected as described in the foregoing method and the particle size may be in the same range. The boron composition which may be used in such mixture may be elemental boron or a boron compound such as boron nitride or boron carbide or a mixture thereof. The preferred boron composition is boron nitride because of its resistance to oxidation and the ease with which it forms fine powders. The weight concentration of boron in said mixture is in the range of from about 0.5% to about 3%. Thus, in the case of a boron compound such as boron nitride, the weight concentration of the boron composition must be correspondingly increased to insure that the concentration of the boron is sufficient. With respect to particle size, it has been found when using boron nitride that a particle size of −325 mesh is adequately small. After forming said body, the next step of the method is to heat such body to a temperature above the sintering temperature of the refractory metal for a time period adapted to sinter the refractory metal powder to a selected pore size. In the case of the tungsten ionizer described above, a temperature of about 1800° C. for a time period of about 30 minutes was found to be sufficient. The porous body produced by such method has a stable high porosity and permeability and comprises a sintered refractory metal powder having substantially all of its surface area coated by a boron composition. In the case of the tungsten ionizer using a boron nitride composition, a major portion of the coating appears to be primarily a tungsten boride compound while the minor portion is a complex compound of tungsten, boron, and nitrogen.

Still another method of the present invention for producing a stable porous body having a selected pore size and concentration and large surface area comprises forming a porous body comprising a mixture of fine refractory metal powder, fine boron composition powder, and fine inert metal powder. Each of the constituents of such mixture is the same as described in the foregoing methods and is present in the same weight concentrations. The formed porous body is then heated in the manner described in the first method set forth above. The porous body resulting from such method comprises a sintered refractory metal powder with substantially all of its pores being elongated so that the length to width ratio is greater than about five and with substantially all of its surface coated by a boron composition.

Some specific examples of the method of the present invention and the resulting porous body are as follows:

EXAMPLE 1

A mixture was formed of angular tungsten powder having a particle size of about 0.8 micron and copper powder having a particle size of —400 mesh with the weight concentration of the copper in such mixture being 8%. The mixture was placed in a rubber bag and hydrostatically pressed at 60,000 p.s.i. After pressing, the compact was presintered in hydrogen for two hours at 1050° C. After cooling in hydrogen, the compact was placed in a vacuum furnace and the copper evaporated by heating to 1500° C. under a pressure of $10^{-4}$ torr until the copper was completely removed. The temperature was then raised to 1800° C. for 30 minutes to complete the sintering. The resulting body was then used as an ionizer in an ion engine utilizing cesium vapor. It was found to have very uniform permeability (tested with nitrogen) with a density in the range of 64–67% of theoretical density. The average pore size was about 3.9 microns and the pore density was only about 1.7 million pores per square centimeter. When used in the ion engine, an ion current of about 20–28 ma./cm.$^2$ was obtained. The neutral fraction was 0.1% or less, which was 5 to 10 times lower than the best results obtained with porous bodies formed from fine spherical powder tungsten.

EXAMPLE 2

A mixture of fine angular tungsten powder having a particle size of about 0.8 micron, fine copper powder having a particle size of —400 mesh, and fine boron nitride powder having a particle size of —325 mesh was formed with the weight concentration to copper being 8% and boron nitride being 4% (2% boron). The mixture was processed as set forth in Example 1 and the resulting porous body was tested as an ionizer in an ion engine using cesium vapor. The resulting porous body was found to have a very low density of 48% of the theoretical density and a permeability which was substantially unchanged when heated at 1600° C. in a vacuum of $10^{-6}$ torr for 8 hours while a comparable spherical powder tungsten body had a permanent permeability reduction of 35% during such time period with the permeability continuing to drop.

All of the methods of the present invention and the products produced thereby have been described particularly with respect to ionizers for ion engines; however, such methods and products have many other obvious fields of use. One immediate application of such methods and products is for high density electron sources in high power tube devices such as traveling wave tubes. Other applications of the methods and products of the present invention include refractory structures such as lamp filaments, rocket nozzles, high temperature bearings, and turbine blades. In many such structures, it is necessary to cool them by processes such as transpiration cooling wherein liquid flows through the porous structure and evaporates to protect the surface of the structure. Under such circumstance, stable, uniform permeability during high temperature operation is essential, and the method and products of the present invention achieves such result.

There are many features in the present invention which clearly show the significant advance the present invention represents over the prior art. Consequently, only a few of the more outstanding features will be pointed out to illustrate the unexpected and unusual results attained by the present invention. One feature of the present invention is the use of an inert high melting metal powder in a mixture with a refractory metal powder in the process of forming a sintered porous body so that a pre-sintering pattern is established in the body prior to the final sintering step. By such technique, ordinary, relatively inexpensive, refractory metal powder having a high surface free energy may be utilized to form a sintered body without the usual rapid densification of such body at high operating temperatures. Also, the resulting porous body has uniform elongated pores and a high pore area on its surface so that exceptionally uniform permeability is obtained. Likewise, when used as an ionizer, exceptionally uniform ion emission from the surface is also obtained. Another feature of the present invention is the use of a boron composition powder in a mixture with a refractory metal powder to produce a stable porous body having a low density. Thus, where a preformed pore is not needed or desired, the inert metal may be omitted and only boron or boron nitride is used in a mixture with the refractory metal powder (e.g., tungsten, molybdenum, tantalum) so as to produce a sintered porous body of high thermal stability. Such body maintains its permeability for high operating temperatures over long time periods unlike previous porous bodies whose permeability is reduced very substantially. Still another feature of the present invention is the combination of an inert, high melting metal powder and a boron composition powder with a mixture with a refractory metal powder to form a porous body. Such body has the combined desirable characteristics described above so that it represents a very substantial advance over the available methods and products and yet may be achieved relatively inexpensively.

It will be understood that the foregoing description and examples are only illustrative of the present invention and it is not intended that the invention be limited thereto. All substitutions, alterations, and modifications of the present invention which come within the scope of the following claims or to which the present invention is readily susceptible without departing from the spirit and scope of this disclosure are considered part of the present invention.

What is claimed is:
1. A method for producing a porous body having a selected pore size and concentration and large surface area comprising:
  (a) forming a porous body comprising a mixture of fine refractory metal powder and a material selected from the group consisting of (i) fine inert metal powder and (ii) a mixture of fine inert metal powder and fine boron composition powder, said inert metal being substantially insoluble in said refractory metal and having a melting temperature above the sintering temperature of said refractory metals;
  (b) heating said body to a temperature above said sintering temperature and below said melting temperature for a time period adapted to establish a sintering pattern in said body; and
  (c) heating said body to a temperature above said melting temperature for a time period adapted to substantially completely evaporate said inert metal powder and sinter said refractory metal powder to a selected pore size.

2. The method as stated in claim 1 wherein the weight concentration of said inert metal powder in said initial porous body mixture is in the range of about 5% to about 15%.

3. The method as stated in claim 1 wherein the heating step of subparagraph (c) comprises heating said body at a first temperature above said melting point for a first period of time adapted to substantially completely evaporate said inert metal powder and then heating said body at a second temperature above said first temperature for a second period of time to complete the sintering of said refractory metal powder to said selected pore size.

4. The method as stated in claim 1 wherein said boron composition is boron nitride.

5. The method as stated in claim 1 wherein said inert metal powder is copper.

6. A method for producing a porous body having a selected pore size and concentration and large surface area comprising:
- (a) forming a porous body comprising a mixture of fine refractory metal powder and fine inert metal powder, said inert metal being substantially insoluble in said refractory metal and having a melting temperature above the sintering temperature of said refractory metal;
- (b) heating said body to a temperature above said sintering temperature and below said melting temperature for a time period adapted to establish a sintering pattern in said body; and
- (c) heating said body to a temperature above said melting temperature for a time period adapted to substantially completely evaporate said inert metal powder and sinter said refractory metal powder to a selected pore size whereby said inert metal powder is substantially completely evaporated and said refractory metal powder is sintered to said selected pore size.

7. A method as stated in claim 6 wherein said refractory metal is selected from the class consisting of Groups IV-B, V-B, VI-B, VII-B, and VIII metals.

8. A method as stated in claim 7 wherein said refractory metal is tungsten.

9. A method as stated in claim 7 wherein said refractory metal is molybdenum.

10. A method as stated in claim 6 wherein said inert metal is selected from the class consisting of Groups I-B, II-B, III-A, and IV-A metals.

11. A method as stated in claim 10 wherein said inert metal is copper.

12. A method as stated in claim 6 wherein the weight concentration of said inert metal powder in said mixture is in the range of about 5% to about 15%.

13. A method for producing a stable porous body having a selected pore size and concentration and large surface area comprising:
- (a) forming a porous body comprising a mixture of fine refractory metal powder, fine boron composition powder, and fine inert metal powder, said inert metal being substantially insoluble in said refractory metal and having a melting temperature above the sintering temperature of said refractory metal;
- (b) heating said body to a temperature above said sintering temperature and below said melting temperature for a time period adapted to establish a sintering pattern in said body; and
- (c) heating said body to a temperature above said melting temperature for a time period adapted to substantially evaporate completely said inert metal powder and sinter said refractory metal powder to a selected pore size whereby said inert metal powder is substantially completely evaporated and said refractory metal powder is sintered to said selected pore size.

14. A method as stated in claim 13 wherein said refractory metal is selected from the class consisting of Groups IV-B, V-B, VI-B, VII-B, and VIII metals.

15. A method as stated in claim 14 wherein said refractory metal is tungsten.

16. A method as stated in claim 14 wherein said refractory metal is molybdenum.

17. A method as stated in claim 13 wherein said inert metal is selected from the class consisting of Groups I-B, II-B, III-A, and IV-A metals.

18. A method as stated in claim 17 wherein said inert metal is copper.

19. A method as stated in claim 13 wherein the weight concentration of said inert metal powder in said mixture is in the range of from about 5% to about 15%.

20. A method as stated in claim 13 wherein the weight concentration of boron in said mixture is in the range from about 0.5% to about 3%.

21. A method as stated in claim 13 wherein said boron composition is boron.

22. A method as stated in claim 13 wherein said boron composition is boron nitride.

References Cited

UNITED STATES PATENTS

| | | | |
|---|---|---|---|
| 2,744,011 | 5/1956 | Samual | 75—222 X |
| 3,360,347 | 7/1964 | Todd | 75—222 X |
| 3,397,968 | 8/1968 | Lavendel | 75—222 X |

CARL D. QUARFORTH, Primary Examiner

A. J. STEINER, Assistant Examiner

U.S. Cl. X.R.

29—182.5; 75—222